US007590689B2

(12) United States Patent
Draper et al.

(10) Patent No.: US 7,590,689 B2
(45) Date of Patent: Sep. 15, 2009

(54) ASSOCIATING MULTI-LINGUAL AUDIO RECORDINGS WITH OBJECTS IN INTERNET PRESENTATION

(75) Inventors: Dave Draper, Southhampton (GB); Steve Groeger, Creekmoor Poole (GB); Brian Heasman, Ixelles Bruxelles (BE); Benoît Löscher, Verviers (BE); Christopher Von Koschembahr, Ohain (BE); Steve Raspoet, Ternat (BE)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 09/996,087

(22) Filed: Nov. 28, 2001

(65) Prior Publication Data

US 2003/0101220 A1 May 29, 2003

(51) Int. Cl.
*G06F 15/16* (2006.01)
(52) U.S. Cl. .................. 709/204; 707/4; 704/277; 715/536
(58) Field of Classification Search ........ 704/277; 340/825.25; 381/255; 370/85.1; 434/319; 345/329, 331, 9; 707/501, 4; 709/204; 715/536
See application file for complete search history.

(56) References Cited

U.S. PATENT DOCUMENTS 5,351,276 A * 9/1994 Doll et al. ............ 379/88.17
5,675,507 A * 10/1997 Bobo, II .................. 709/206
5,797,125 A * 8/1998 Hirohama ................ 704/277
5,945,989 A * 8/1999 Freishtat et al. ......... 715/760

FOREIGN PATENT DOCUMENTS

WO    WO0038394    *  6/2000

* cited by examiner

*Primary Examiner*—Saleh Najjar
*Assistant Examiner*—Thuong (Tina) T Nguyen
(74) *Attorney, Agent, or Firm*—Michael J. Buchenhorner; Vazken Alexanian; Louis P. Herzberg

(57) ABSTRACT

Methods for associating multi-lingual audio recordings with visual objects in a presentation system accessed by the Internet network wherein a plurality of visual objects such as charts or slides controlled by a third party in a server can be accessed by any user of the network. Each visual object being associated with an audio recording in any language selected amongst several predetermined languages. In an example embodiment, the method comprises the steps of calling the third party server by the user in charge of the audio recording associated with a visual object via the Public Switched Network, prompting the user on his telephone to enter his user ID; and transmitting by the keypad of the telephone the user ID including a first part defining a first language to be used for recording the recording, whereby displaying the visual object will be automatically synchronized with the audio recording.

1 Claim, 4 Drawing Sheets

US 7,590,689 B2

ASSOCIATING MULTI-LINGUAL AUDIO RECORDINGS WITH OBJECTS IN INTERNET PRESENTATION

FIELD OF INVENTION

The present invention relates to Internet systems enabling conferences and presentations by means of charts or slides accompanied with audio recordings to audiences anywhere in the world. More particularly, it relates to associating multi-lingual audio-recordings with visual objects in an Internet presentation system.

BACKGROUND

Today, audiences including thousands of participants in the world can attend conferences and presentations broadcast by the Internet network. During such a presentation, the participant can view visual objects such as charts, slides, images, graphics (generally in PowerPoint) and listen to prerecorded audio recordings associated with each visual object.

In general, the speaker who is in charge of adding audio comments to the visual object, does not assemble the final deliverable contents but could, via access to the Internet web pages, invoke the assembly process. The assembly is normally done by a third party who has the skills in creating the synchronized objects or an automatic system.

But there are many problems associated with creating a presentation having a synchronized audio recording to the visual objects. Thus, the speaker must have a ready access to equipment like a recording machine, a microphone or a PC with audio support to create the recording. An alternative is to go to a recording studio and to use facilities there, but this is not always immediately available and it is an expensive solution. If the user chooses to use a tape recorder, the third party which receives this media must have a similar equipment available to replay the recording.

Associating the audio recordings with the objects is also a problem. Indeed, the objects to which the audio files are associated, normally follow some sequential numbering scheme. However, there may not be sequential audio recordings due to some objects not requiring audio or the objects are not sequential. The speaker who is the person defining which objects require audio has to provide explicit documentation on the association. Such a manipulation being manually performed, the process can be subject to errors.

Ensuring that each audio recording is correctly associated with the visual objects requires that the people in charge of the association must be familiar with the language used or have very explicit instructions in their native language to correctly associate the audio recordings with the objects. The third party may be associating more than one language to a single object. If the recording is not pre-edited into segments, it requires editing and therefore an expertise in the language spoken by the speaker is required.

SUMMARY OF THE INVENTION

Accordingly, an aspect of the present invention is to provide an Internet presentation system enabling the user to make audio recordings associated respectively with the visual objects of the presentation whatever the language used in the audio recording.

The invention provides methods of associating multi-lingual audio recordings with visual objects in a presentation system accessed by the Internet network. A plurality of visual objects such as charts or slides controlled by a third party in a server can be accessed by any user of the Internet network. The visual objects are each associated with an audio recording in any language selected amongst several predetermined languages.

An example embodiment of a method of the present invention comprises the steps of calling the third party audio recording server by the user in charge of the audio recording associated with a visual object via the Public Switched Network, prompting the user to enter his user ID; and transmitting by the keypad of the telephone a user ID including a first part defining a first language to be used for recording the audio recording.

BRIEF DESCRIPTION OF THE DRAWINGS

The above and other aspects, features and advantages of the invention will be better understood by reading the following more particular description of the invention in conjunction with the accompanying drawings wherein.

DETAILED DESCRIPTION OF THE INVENTION

The present invention provides methods, apparatus and systems for associating multi-lingual audio recordings with visual objects in a presentation system accessed by the Internet network, wherein a plurality of visual objects such as charts or slides controlled by a third party in a server can be accessed by any user of the Internet network. The visual objects being associated each with an audio recording in any language selected amongst several predetermined languages.

An example embodiment of such a method comprises the steps of calling the third party audio recording server by the user in charge of the audio recording associated with a visual object via the Public Switched Network, prompting the user to enter his user ID (which will determine the language of subsequent voice prompts); and transmitting by the keypad of the telephone a user ID including a first part defining a first language to be used for recording the audio recording.

Then, the user can enter his password and proceed to make audio recordings in the chosen language. He selects the chart or object he wants to make a recording for and makes a recording. He can replay that recording at anytime and re-record the audio if not satisfied. On completion of the recordings, the user then initiates an automatic update process which automatically synchronizes the audio recordings to the visual objects.

Assuming that the third party responsible for the presentation system has got the charts or slides to be presented to customers connected to the Internet network, a speaker (called the user in the following) has to record audio files each being associated with each chart or slide.

Figure 1:
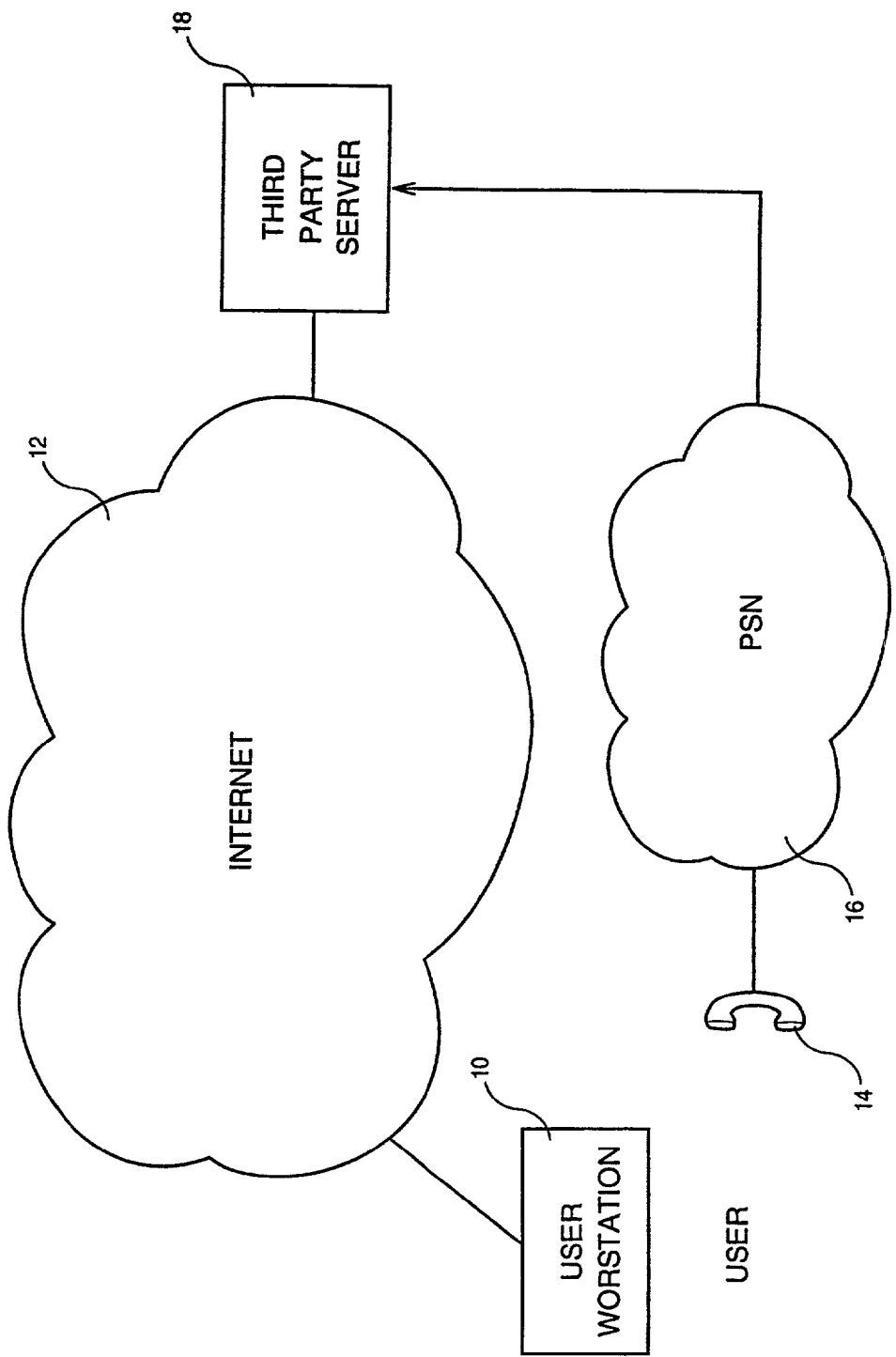
FIG. 1 is a block-diagram representing a general context wherein the invention is implemented.

As illustrated in FIG. 1, the user has at his disposal a workstation 10 connected to the Internet network 12 and a telephone set 14 connected to the Public Switched Network (PSN) 16. The third party server 18 including the charts slides or objects in general which can be broadcast to customers by the Internet network 12 is also connected to PSN 16.

Figure 2:
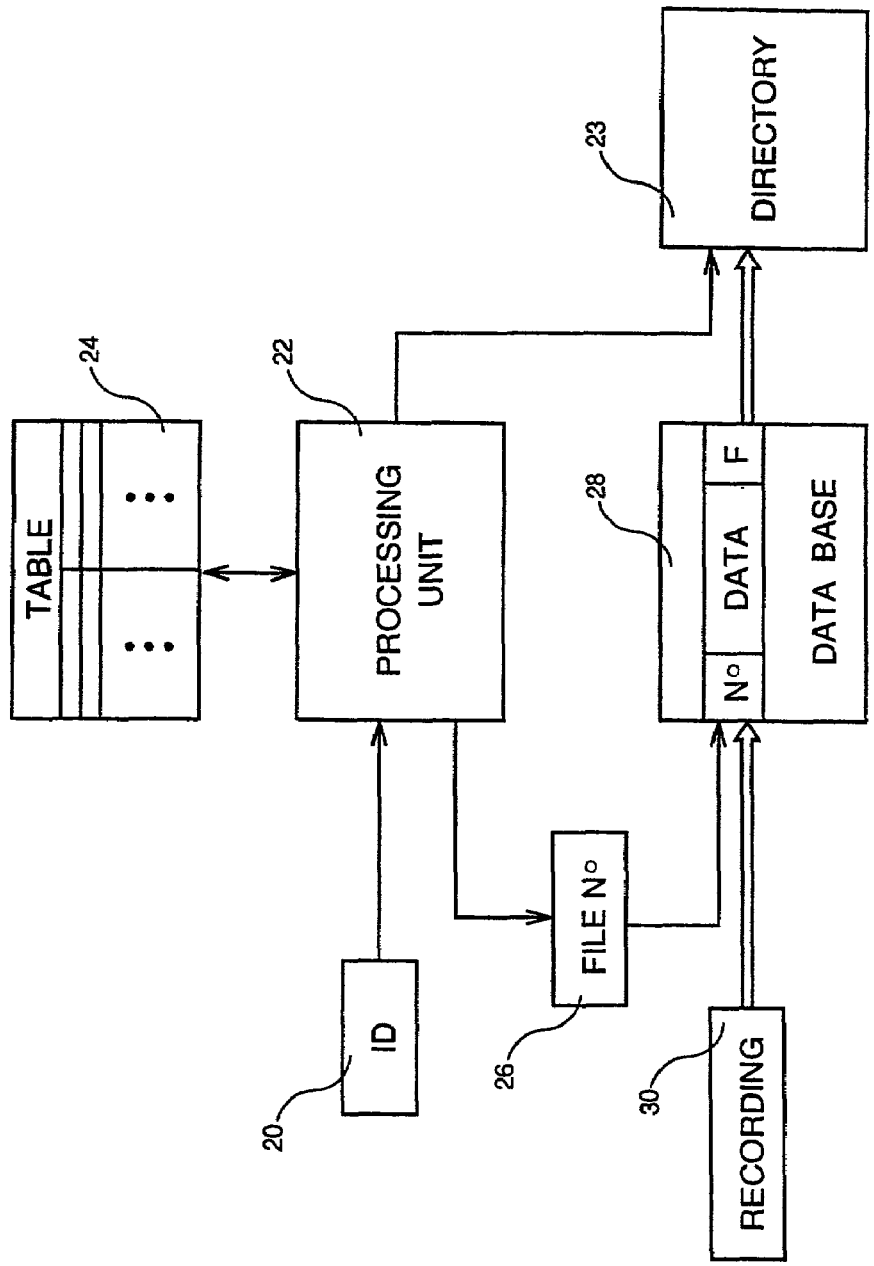
FIG. 2 is a block-diagram of an example of functional means used by a third party to implement the invention.

Prior to using the presentation system, the user is provided with a user identification number ID, a password and a telephone number (via web pages, e-mail or conversation with the third party). When the user wants to record the audio recordings, he calls the third party server 18. At this time, the user is prompted to enter his ID by means of the keypad on his telephone 14. Note that this voice prompt can be in multiple languages. As illustrated by the block-diagram of FIG. 2, the ID 20 is processed in the server by a processing unit 22 which represents the sophisticated facilities (hardware and software) of the server to control and manage the system.

The ID entered by the user determines the language to be used, the naming convention for the file and the location for the stored recordings. In general the third party has stored the objects for which audio is to be recorded in the same location as that specified by the ID in a directory 23, or the user through an automated process will place the objects into the location specified within the ID. Thus, for example, the ID may contain the number 6666 which is the directory name in which the final recordings are to be stored.

On receiving the ID, processing unit 22 determines the language in which it must prompt the user and the file naming convention it must use to store the audio recordings. For example, the ID could be 366661 meaning that the directory number is 6666 and the language code is 31. Note that the number 31 could be placed at the beginning or at the end of ID entered by the user. With this language code, the processing unit 22 determines in a language table 24, which is the language will be used to prompt the user and the file naming language used for the recording.

When processing unit 22 has determined the language to be used and after the user has entered the number of the visual object associated with the audio recording, it generates a file number 26 to designate the recording file to be stored in a data base 28. In the example, such a file number could be 6666: engxx wherein 6666 is the directory name, eng corresponds to the language "English" corresponding to language code 31 in table 24 and xx is the number of the chart or slide with which the recording is to be associated.

After that, the user can record the audio recording which is stored in data base 28 in a file having the file number 26 as defined above. The processing unit also writes a flag (one bit) at the end of the file for indicating that it is a new recording which will need to be copied in directory 23. The copying operation is achieved by the processing unit when the user requests an "update" as explained below.

Figure 3:
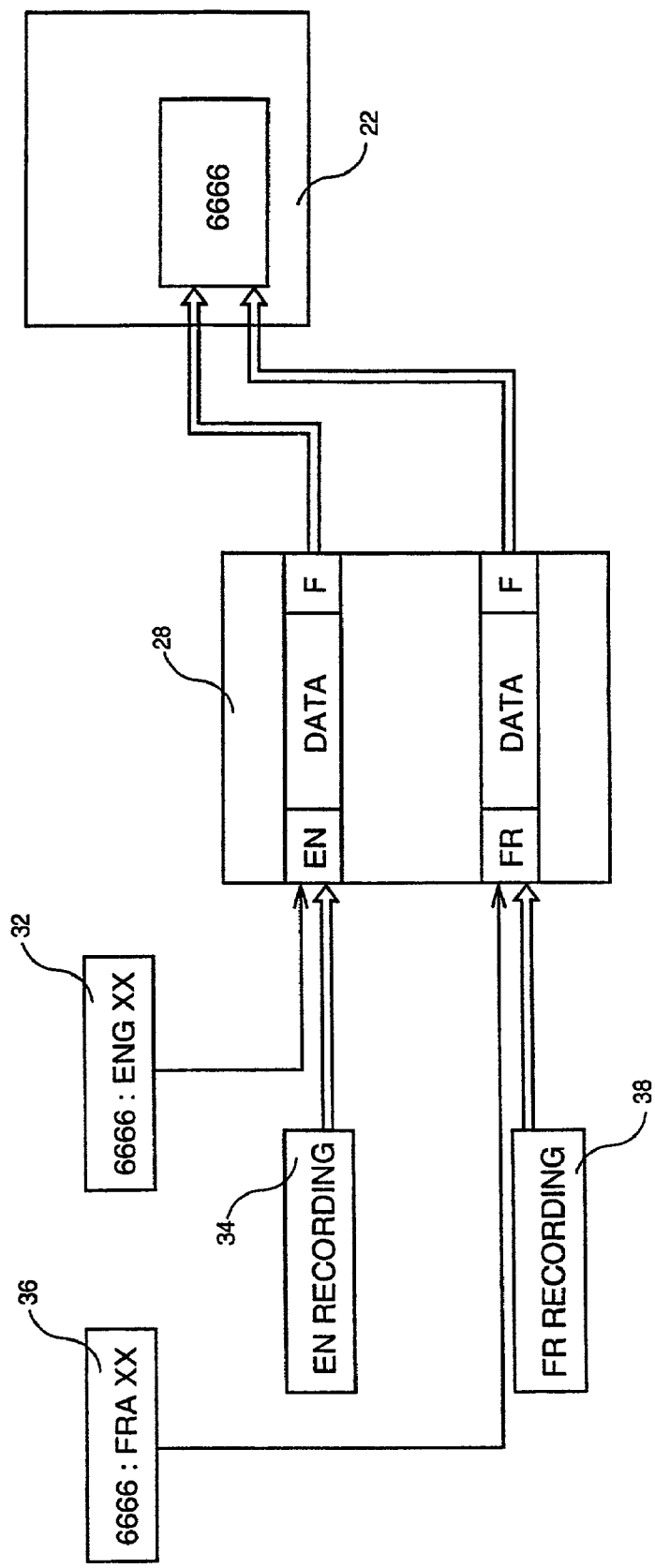
FIG. 3 is an example of a schematic diagram showing the recording of two audio files in English and in French by the system of the invention.

Referring to FIG. 3, it is shown how the language code included in the ID entered by the user is an essential feature of the invention. As a matter of fact, with a first language code, the processing unit determines in the language table that English has to be used for the recording. Using the file naming convention, the processing unit defines a file number 32 for example 6666:engxx. This number is used to record the English recording 34 in a first location of the data base 28. But, assuming that French is now the language to associate with the same chart or slide, a different file number 36, for example 6666:frexx, is defined by the processing unit for the new recording. Then, this number will be used as file number to record the French recording 38, and to store this file into another location of data base 28. Whatever language is used, the different recordings corresponding to the same presentation will be then copied in directory 23 at the location defined by the same directory name, 6666 in the example.

Figure 4:
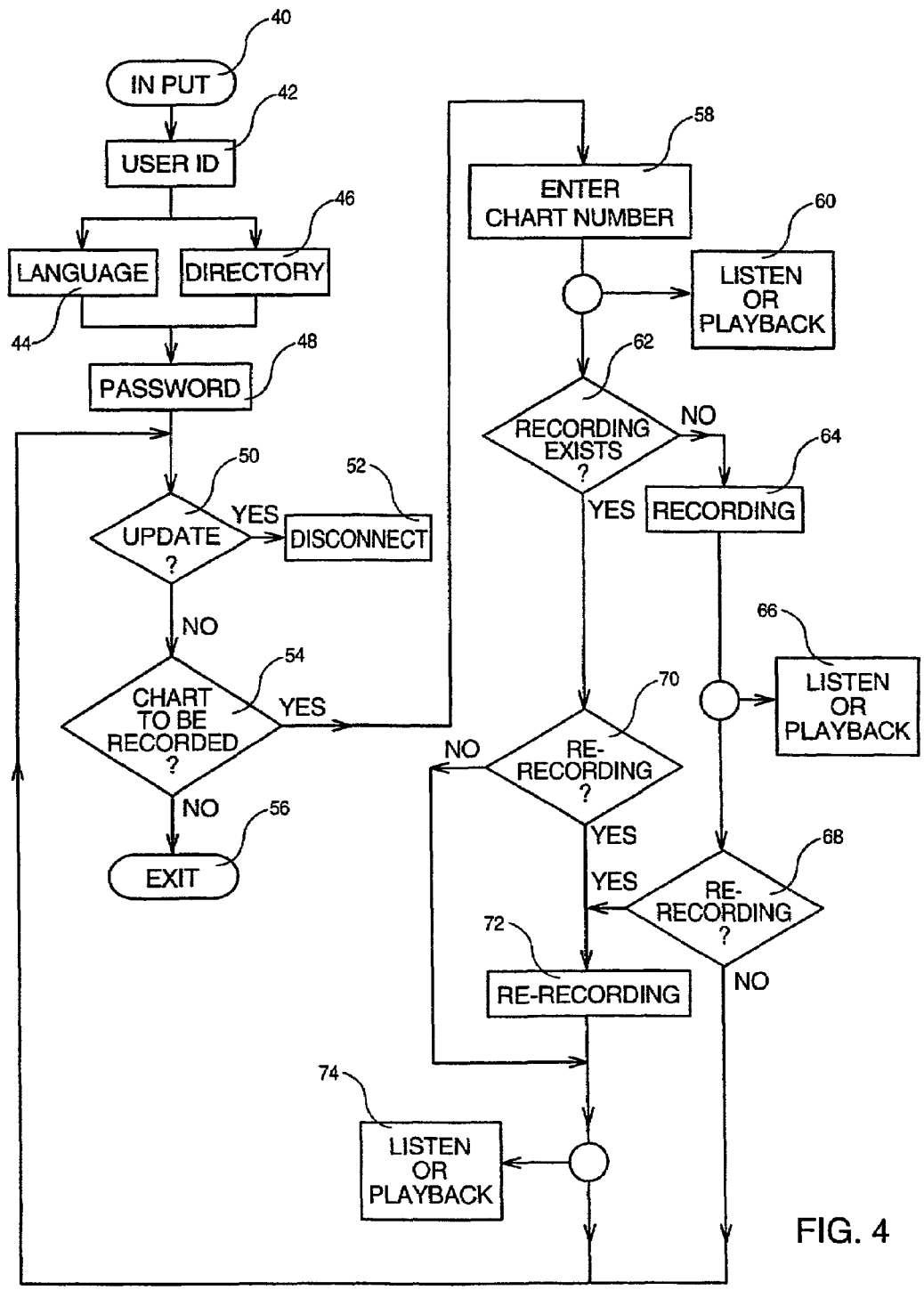
FIG. 4 represents an example of a flow chart of the different steps used in a method according to the invention.

Now, the process according to the invention is described in reference to FIG. 4. After inputting the system (step 40) by calling the third party via the Public Switched Network, the user transmits his user ID (step 42). As explained above, the processing unit of the server determines the language to be used (step 44) and the directory in which the recording has to be copied (step 46). Then, the user has to enter a password (step 48) which is used to determine whether he is a valid user of the ID.

After that, the user has to decide whether he wants to "update" that is to copy recordings already stored from the data base to the directory determined in the ID (step 50). If so, the user is disconnected (step 52). Such a disconnection is necessary since, during the copying process which takes a short time (about 30-45 seconds) the user cannot make any changes to the recordings. If the user calls back immediately, it can be expected that, by the time he has entered the ID and the password, the copying process will be completed. Note that the recordings have a flag which is set to 1 when they are recorded, are reset to 0 after they are copied into the directory so that only the recordings having a flag set to 1 are copied which reduces considerably the work load on the system.

Then, it is determined whether the user has a chart to be recorded (step 54). If not, the connection was only to update the existing recordings and the process is exit (step 56). If there is at least a chart to be audio recorded, the user enters the chart number (step 58). It must be noted that the message to be entered is generally split into 3 parts wherein the chart number can be part 2 followed by instructions or the instructions can be in part 1 and part 3 is a blank recording, depending upon the language which is used.

Generally, at this stage, the user is prompted by the system to know whether he wants to listen to a previous recording or to have a continuous playback of the already recorded audio files (step 60). The feature of continuous playback is to allow the user to hear if there is a continuity between the recordings. This is a valuable productivity aid for the user since he does not have to select the next chart and more valuable when there are multiple recordings since it is a way of easily finding missing recordings in a sequence of recordings. In the latter case, the system states that no recording exists and can prompt the user if he wants to record one.

Then it is determined whether a recording exists for the chart number entered by the user (step 62). If not, the user is prompted to start the audio recording (step 64) which will be stored in the data base with the file number defined from the ID as previously explained. Again, the user may be requested to listen to the recording or to playback all the recordings (step 66). As the user may be not entirely satisfied with the recording, it is determined whether he wants to make a re-recording (step 68). If not, the process is looped to the beginning before the update (step 50).

Assuming that there is already a recording corresponding to the chart number entered by the user, the same way as previously, it is determined whether the user wants to make a re-recording (step 70). If it is the case or if after recording the audio file, the user is not satisfied (see step 68), the user may start to re-recording (step 72). Again, the user may generally listen to his re-recording or make a continuous playback of the recordings (step 74). Of course, when the user does not want a new recording after the first recording, he does not start re-recording and this step is jumped. Then, the process loops to the beginning before the update (step 50).

It must be noted that the user can all the time have access to the system for returning to the "update" step or change any one of the recordings by calling again the third party, entering the ID and then the password. For practical purposes, there could be a time limit set on access time.

When a recording is changed afterwards, the flag is also set to 1 in the audio file so that only this recording will be copied from the data base to the directory.

When recording an audio file for a chart or slide, the synchronization between this one and the audio recording is automatically achieved. When the chart or slide will be displayed to a presentation participant, it will be displayed during all the time of the audio recording. In other words, the same chart is synchronized with the recordings corresponding to the different languages. However, the presentation has always the option to stop the audio playing or to go quickly to the next chart.

Although the system is used today for producing an audio recording that is associated with a slide or chart, it is not limited to producing audio recordings for only this purpose. Many objects (slides, text, html pages, animation etc.), today require narration or audio, the addition of audio to one of these objects, to enhance the end user experience by being able to see the objects and at the same time have a supportive audio track. So, as technology changes, then this equipment can be used in support of newspaper articles, where you hear the reader etc. Also, as the web moves to encompass those users with physical disabilities, there is a need to produce audio versions of visible text or objects. The system could be used to record these. Similarly, the final delivery medium may not be the Internet, it could be a CD, diskette, be stored on a server and accessed by other means.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for associating multi-lingual audio-recordings with visual objects comprising:

associating multi-lingual audio recordings with visual objects in a presentation system accessed by the Internet network, wherein a plurality of visual objects, including at least one of a chart, a slide and another presentation object, controlled by a third party in a server can be accessed by any user of said Internet network, said visual objects being associated each with an audio recording in a particular language selected from amongst several predetermined languages, wherein associating multi-lingual audio recordings includes calling said third party server by a user in charge of the audio recording associated with a visual object via the Public Switched Network, prompting said user on said users telephone to enter said user's user ID; and transmitting by a keypad of said telephone said user ID including a first part defining a first language to be used for recording said audio recording, whereby displaying of said visual object by said workstation is automatically synchronized with said audio recording;

entering a number assigned to said visual object associated with said audio recording by the user at said telephone after said user has transmitted said user ID;

transmitting a password by the user at said telephone after having transmitted said user ID, wherein said user ID includes a second part defining a directory name wherein the file containing said audio recording is stored;

generating by said third party server a first file name including said directory name and a code defining said first language when ID is received by said third party serve, wherein said audio recording in said first language is stored in a data base by using said first file name;

transmitting from said telephone another ID containing a first part defining a second language to be used for recording said audio recording and a second part defining said directory name, generating by said third party server another file name including said directory name and a code defining said second language; and copying said audio recording corresponding to said first file name from said data base to a directory at said directory name, said step of copying being activated by the user at said telephone, wherein the file containing said audio recording includes a flag set when said audio recording is recorded for one of a first time and having been changed and is reset when said file is copied from said data base to said directory.

* * * * *

UNITED STATES PATENT AND TRADEMARK OFFICE
CERTIFICATE OF CORRECTION

PATENT NO.        : 7,590,689 B2                                  Page 1 of 1
APPLICATION NO.   : 09/996087
DATED             : September 15, 2009
INVENTOR(S)       : Draper et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this

Twenty-first Day of September, 2010

David J. Kappos
*Director of the United States Patent and Trademark Office*